United States Patent Office 3,095,276
Patented June 25, 1963

3,095,276
PRODUCTION OF SULFUR
Peter Urban, Northbrook, Ill., assignor to Universal Oil Products Company, Des Plaines, Ill., a corporation of Delaware
No Drawing. Filed July 21, 1961, Ser. No. 127,787
15 Claims. (Cl. 23—225)

This invention relates to a method for the production of sulfur and particularly to a method for producing sulfur from hydrogen sulfide. In addition, the invention is also concerned with a method for purifying a gas stream by removing hydrogen sulfide from said stream.

In many industrial processes large amounts of sulfur, which is a by-product of the particular reactions, are wasted by being vented to the atmosphere as hydrogen sulfide. Typical of these industrial processes are those for preparing various petroleum products, coking of coal, manufacture of steel and others. In many cases, and particularly in the refining of gasoline, the sulfur is a contaminate in the ultimate desired product and, if in the form of organic sulfur compounds such as the mercaptans, is converted to hydrogen sulfide during the process of the charge stocks and is subsequently disposed of in that form. Besides being wasteful of a potentially useful source of sulfur, the venting of hydrogen sulfide to the atmosphere creates a nuisance due to its unpleasant odor, which nuisance must be abated in many communities in order to conform to local ordinances and/or regulations pertaining thereto.

Several solutions to this problem have been put into effect and these solutions are concerned in the most part with the abatement of the nuisance rather than the conservation or production of the sulfur. The latter processes are usually difficult to effect and, in the most part, are relatively costly inasmuch as said processes usually consist of converting the hydrogen sulfide formed during the particular manufacturing or refining operation to sulfur, sulfuric acid or to some other form of sulfur which is salable to other industries which require the presence of sulfur in their particular operation. One such solution has been to separate the hydrogen sulfide from the main stream by such means as an absorber employing an alkaline liquid such as an amine or metal hydroxide solution in countercurrent contact with the hydrogen sulfide-containing gas. The absorbing liquid is then stripped of hydrogen sulfide and the hydrogen sulfide is partially burned to form sulfur dioxide and water, the remainder of the hydrogen sulfide being reacted with sulfur dioxide to produce sulfur and water. The reaction is effected at high temperatures and preferably at high pressures while utilizing a heterogeneous catalyst. This method has many unsatisfactory features including the expense and difficulty of concentrating hydrogen sulfide by means of an alkaline solution with subsequent stripping, the use of heterogeneous catalysts which are not too well suited to chemical processes resulting in solid products and the difficulty of using corrosive materials such as water-sulfur dioxide mixtures at high temperatures. In addition, the other prior art methods have employed a hygroscopic solvent wherein the sulfur dioxide and hydrogen sulfide may be dissolved and reacted in the presence of a catalytic amount of water to form sulfur. However, the solvents which have been used consisted of organic hydroxy materials such as mono- and poly alcohols, one particular type of solvents which were used comprising ethylene glycol, diethylene glycol, triethylene glycol, etc. A disadvantage of using solvents of this type, particularly those of low molecular weight, is that this type of solvent is relatively expensive and, in order to make the process commercially feasible, must be recovered and recycled to the reactor, thus necessitating the added expense of a solvent recovery system which must operate at peak efficiency.

Yet another form of obtaining or producing sulfur is to react hydrogen sulfide and sulfur dioxide in the presence of a hydrocarbon solvent which is water saturated and in addition contains a catalytic amount of free water. However, a disadvantage in this recovery system as well as the glycol recovery system is that a water-sulfur dioxide combination is corrosive in nature and therefore the corrosion problem will constitute a major factor in plant maintenance and replacement of apparatus or equipment costs.

In addition another process for the removal of hydrogen sulfide has been to treat a charge stock containing hydrogen sulfide as a contaminant with an alkaline solution of the sodium salts of a mixture of 2,6 and 2,7-anthraquinone disulfonic acids plus sodium vanadate in a carbonate solution in an air oxidation medium whereby the hydrogen sulfide is oxidized to form sulfur. The sour gas containing the hydrogen sulfide contaminant is passed through an adsorption tower containing washing grids where it is contacted with the aforementioned reagent. The hydrogen sulfide in the gas stream is adsorbed in the alkaline solution thereby sweetening the gas stream which is removed from the system. Following this the hydrogen sulfide rich solution passes to a reaction vessel wherein the residence time is sufficient for the hydrogen sulfide to react with carbonyl radicals of the reagent to form the corresponding hydroquinone and sulfur. Following this the effluent from the reaction vessel is passed to an oxidation tower wherein the hydroquinone is contacted with air and converted back to the quinone. The resulting quinone solution containing the free sulfur in suspension is drawn off and passed to separation means wherein the sulfur is recovered and the regenerated anthraquinone solution is recycled to the washing tower. However, this system as in the case of the other processes hereinbefore mentioned, also has a disadvantage in that carbon dioxide is released during the absorption process if the process is operated at the proper pH level. This release of carbon dioxide may be due to the formation of acids during the oxidation of the hydrogen sulfide to sulfur. If carbon dioxide is released, the cost of the operation is increased inasmuch as it is then necessary to decarbonate the washing medium. In order to effectively control the release of carbon dioxide it is necessary that the carbonate-bicarbonate solution must be kept as strong as the bicarbonate solubility will permit, the contact time between the gas and the liquor should be as short as possible and the absorption towers must be operated with a high gas velocity and a low liquid flow. All of these conditions which must thereby be operated within a critical range will, of necessity, increase the cost of the operation of the unit. As hereinbefore set forth since some carbon dioxide is always removed by the alkaline solution of the process there is a continuous conversion of sodium carbonate to sodium bicarbonate and if this occurs the pH of the washing medium will fall below the level required for the removal of hydrogen sulfide from the gas stream. Therefore decarbonation of the washing medium is required, said decarbonation usually being effected by heating a small percentage of the circulating liquor in a heat exchanger and allowing the liquor to flow down a column up which hot air or steam has been blown. The carbon dioxide is released from the solution and carried away by the gases passing up the tower. However, this produces another drawback or disadvantage in that the effluent liquor has a high carbonate to bicarbonate ratio and is at a relatively high temperature so that it must be cooled before being returned to the circulating liquor.

It is therefore an object of this invention to provide a process for purifying a feed material containing hydrogen sulfide as an impurity.

A further object of this invention is to provide a process for producing sulfur from a gas stream containing hydrogen sulfide as an impurity thereof by providing a relatively simple sulfur production process which will result in a large conversion of hydrogen sulfide to substantially pure sulfur in a relatively inexpensive method of operation.

One embodiment of this invention resides in a process for the production of sulfur which comprises treating hydrogen sulfide with oxygen in the presence of a catalyst comprising a soluble salt selected from the group consisting of alkali metal and alkaline earth metal acid antimonates, arsenates, borates, phosphates and silicates, and a soluble salt selected from the group consisting of the monosulfonates, polysulfonates, monocarboxylates and polycarboxylates of cobalt phthalocyanine and vanadium phthalocyanine, and recovering the desired sulfur.

Another embodiment of this invention is found in a process for the production of sulfur which comprises treating hydrogen sulfide with oxygen in the presence of a catalyst comprising a soluble salt selected from the group consisting of alkali metal and alkaline earth metal acid antimonates, arsenates, borates, phosphates and silicates, and a soluble salt selected from the group consisting of the monosulfonates, polysulfonates, monocarboxylates, and polycarboxylates of cobalt phthalocyanine and vanadium phthalocyanine at a pH in the range of from about 8 to about 10, and recovering the desired sulfur.

Yet another embodiment of this invention resides in a process for the production of sulfur which comprises treating hydrogen sulfide with oxygen in the presence of a catalyst comprising potassium acid phosphate and a soluble salt selected from the group consisting of the monosulfonates, polysulfonates, monocarboxylates and polycarboxylates of cobalt phthalocyanine and vanadium phthalocyanine at a pH in the range of from about 8 to about 10, and recovering the desired sulfur.

A still further embodiment of the invention is found in a process for the production of sulfur which comprises treating hydrogen sulfide with oxygen in the presence of a catalyst comprising a soluble salt selected from the group consisting of alkali metal and alkaline earth metal antimonates, arsenates, borates, phosphates and silicates and cobalt phthalocyanine trisulfonate at a pH in the range of from about 8 to about 10, and recovering the desired sulfur.

A specific embodiment of the invention resides in a process for the production of sulfur which comprises treating hydrogen sulfide with oxygen in the presence of a catalyst comprising potassium acid phosphate and cobalt phthalocyanine trisulfonate at a pH in the range of from about 8 to about 10, and recovering the desired sulfur.

Other objects and embodiments referring to alternative soluble alkali metal and alkaline earth metal salts of the acid antimonates, arsenates, borates, phosphates and silicates and alternative soluble salts of the cobalt and vanadium compounds will be found in the following further detailed description of this invention.

As hereinbefore set forth it has now been discovered that a gas stream containing hydrogen sulfide as an impurity or contaminant thereof may be sweetened and the hydrogen sulfide converted to elemental sulfur which is also recovered by treating said gas stream with oxygen in the presence of certain soluble salts of the type hereinafter set forth in greater detail.

The use of the soluble salts of alkali metals or alkaline earth metals and the soluble salts of the mono- and polysulfonates of cobalt phthalocyanine, vanadium carboxylate, etc., will permit the recovery of elemental sulfur in a relatively greater yield and without the evolution of carbon dioxide. Hydrogen sulfide is oxidized in the presence of a compound such as the anthraquinone sulfonates and vanadates as catalysts in a carbonate solution, the disadvantage of which was hereinbefore set forth. I have now discovered that hydrogen sulfide may be oxidized in an air medium in the presence of a metallic catalyst which is selected from the group consisting of the amino- and polysulfonates of metallic phthalocyanines or carboxylates. One important advantage which is found in the process of this invention is that the metallic phthalocyanine or carboxylate catalyst is stable under the conditions employed in the oxidation step of this process which is in contrast to the use of other catalysts which either are not effective in producing free sulfur or which will decompose during the reaction and thus will have a very short active useful life. A particularly preferred metal catalyst comprises the metal phthalocyanines such as cobalt phthalocyanine and vanadium phthalocyanine. Other metal phthalocyanines which may be used include the metals of the iron group of group VIII of the periodic table such as iron phthalocyanine, nickel phthalocyanine and cobalt phthalocyanine, etc., as well as certain metal phthalocyanines from groups VIB and VIIB of the periodic table including molybdenum phthalocyanine, manganese phthalocyanine, tungsten phthalocyanine, chromium phthalocyanine, etc. As hereinbefore set forth the preferred catalyst comprises a derivative of the metal phthalocyanine and in particular a preferred derivative is the mono- or polysulfonated derivative. Thus, an especially preferred phthalocyanine catalyst is cobalt phthalocyanine. Such a catalyst is available commercially and comprises cobalt phthalocyanine disulfonate and also contains cobalt phthalacyanine monosulfonate. Another preferred catalyst comprises cobalt phthalocyanine trisulfonate. In addition to the aforesaid cobalt compounds catalytic compositions of matter which may be used include the vanadium counterparts of the aforementioned cobalt compounds such as vanadium phthalocyanine sulfonate, vanadium phthalocyanine disulfonate, and vanadium phthalocyanine trisulfonate. These compounds may be obtained from any suitable source or may be prepared in any suitable manner as, for example, by reacting cobalt or vanadium phthalocyanine with 25% to 50% fuming sulfuric acid. While the sulfonic acid derivatives are preferred, it is understood that other suitable derivatives may be employed. In addition to the aforementioned soluble sulfonated salts of cobalt phthalocyanine and vanadium phthalocyanine it is also contemplated that other derivatives of cobalt and vanadium may be used, particularly the carboxylated derivatives which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis. It is to be understood that the aforementioned different catalysts are not necessarily equivalent.

The other component of the catalytic composition of matter which is utilized in the present invention includes the alkali metal and alkaline earth metal acid antimonates, arsenates, borates, phosphates and silicates, the only limitation being that said salts are soluble in water. Examples of these soluble salts which may be used include sodium acid antimonate, sodium acid arsenate, sodium acid borate, sodium acid phosphate, sodium acid silicate, potassium acid antimonate, potassium acid arsenate, potassium acid borate, potassium acid phosphate, potassium acid silicate, etc. It has now been discovered that, by the use of the aforesaid salts to provide the proper buffering media, an unexpectedly greater conversion of hydrogen sulfied to sulfur is obtained thereby. It is to be further understood that the aforementioned soluble salts are only representatives of the class of compounds which may be used and that the present invention is not necessarily limited thereto.

The use of the aforementioned catalytic compositions of matter when treating hydrogen sulfied in the presence of oxygen will permit the recovery of the sulfur in a granular rather than a collodial state thus eliminating the necessity of relatively expensive equipment inasmuch as collodial sulfur is difficult to recover from the solution. In addition the production of undesirable compounds such as sulfates or sulfites, etc., will be held to a minimum. The oxidation of the hydrogen sulfide to form free sulfur generally is effected with the reaction mixture having a pH above neutral and preferably within a range of from about 8 to about 10 or above. The aforementioned pH range is readily obtainable by the use of the aforementioned alkali metal and alkaline earth metal acid antimonates, arsenates, borates, phosphates and silicates.

The process of the present invention may be effected in any suitable manner and apparatus which may be especially adapted for the particular hydrogen sulfied stream to be treated. For example, when a stream having a high hydrogen sulfied concentration is employed the process may be effected by absorbing both the hydrogen sulfide and oxygen in a pool of solvent, such as water, containing the catalyst. When the source of hydrogen sulfide is a process stream which is to be purified, the solvent may be used in a separate zone as an absorbing medium to remove hydrogen sulfide from the main stream thereby purifying that stream. The hydrogen sulfide-rich solvent is then passed to a separate reaction zone where it is contacted with oxygen in the presence of the aforementioned catalysts of this invention, thereby producing sulfur and further regenerating the solvent for further use in purifying the process stream.

The process may be effected using air or using oxygen per se or mixed with other gases and in addition may be effected by absorbing the reactants in a pool of solvent or in a slurry or suspensoid operation wherein the reactants pass concurrently or countercurrently with the moving solvent and catalyst. In another embodiment the composite of catalyst and adsorptive support may be disposed as a fixed bed in a reaction zone and the oxygen and the solution of sulfide are supplied thereto either cocurrently or concurrently. In still another embodiment, a fixed bed of a basic resin is disposed in a reaction zone and the sulfide, oxygen and catalyst are supplied thereto. The concentration of air or oxygen preferably is approximately that stoichiometrically required to effect the desired oxidation reaction, although lower or higher concentrations may be used in some cases. However, a large excess should not be used as this may tend to result in oxidation of the sulfide beyond the desired free sulfur stage. The reaction may be effected in a countercurrent, multistage manner when complete recovery and conversion are desired and, when so effected, any desired degree of recovery and conversion may be obtained by employing a sufficient number of stages.

The process is effected at any suitable temperature which may range from ambient to 250° C. or more, preferably being within the range of from 25° to 100° C. Superatmospheric pressures may be used and will be beneficial in allowing higher operating temperatures while still maintaining liquid phase solvents and increasing the solubility of the vapor phase reactants in the solution. Superatmospheric pressures may range from 5 to 1000 or more p.s.i.g. and preferably from 10 to 100 p.s.i.g.

The following examples are given to illustrate the process of the present invention which, however, are not intended to limit the generally broad scope of the present invention in strict accordance therewith.

*Example I*

In this experiment 500 cc. of an aqueous solution containing 0.5 mole of potassium acid phosphate and 200 parts per million of cobalt phthalocyanine trisulfonate were placed in a cylindrical shaped vessel provided with baffles and containing a stirring paddle in order to obtain more efficient contact between the reactants and the catalyst. The solution was buffered by the addition of an alkali until a pH of approximately 9 was reached. Hydrogen sulfide was charged to the bottom of the reactor from a small weighed bomb in an amount so that 22.3 g. of hydrogen sulfide (21.1 g. of sulfur, theoretical) containing 0.66 mole was charged to the bottom of the reactor. Oxygen was charged to said reaction vessel at the top thereof and the hydrogen sulfide, oxygen and solution brought into intimate contact by running the stirring paddle at 1750 r.p.m. The reaction vessel was maintained at a temperature of about 50° C. during the reaction time. The temperature rose a small increment due to the oxidation but settled back and was maintained at the aforementioned temperature. In addition the pH of the solution dropped from 9 to about 7.5 during the addition of hydrogen sulfide, however upon oxidation of the hydrogen sulfide by the addition of oxygen the pH again rose until it reached the prior level. Upon completion of the residence time the solution containing elemental sulfur was recovered, the sulfur was filtered off, washed, dried and weighed while the solution itself was reused in subsequent oxidation reactions. There was recovered 18.0 g. of sulfur which comprised 85% of the theoretical.

*Example II*

A similar experiment was run utilizing the same apparatus and an identical solution, said solution again containing 0.5 mole of potassium acid phosphate (1 molar) and 200 parts per million of cobalt phthalocyanine trisulfonate. The reaction conditions were similar to that hereinbefore set forth in Example I, that is, the vessel was maintained at a temperature of about 50° C. and the reaction mixture comprising the solution, hydrogen sulfide and oxygen was stirred by means of a stirring paddle operated at a speed of about 1750 r.p.m. The hydrogen sulfide which was charged from a small weighed bomb to the bottom of the reaction vessel contained 21.6 g. of hydrogen sulfide (20.2 g. of sulfur, theoretical). Upon completion of the run the sulfur was filtered from the solution, washed, dried and weighed, there being recovered 14.3 g. which corresponded to a 71% yield of the theoretical.

*Example III*

To illustrate the efficiency of a system hereinbefore described in Examples I and II above a similar experiment was performed in which 500 cc. of an aqueous solution containing 0.5 mole of potassium carbonate and 0.5% of 2,6- and 2,7-anthraquinone disulfonate plus 0.2% by weight of vanadium oxide was placed in a similar cylindrical shaped vessel provided with baffles and a stirring paddle. A hydrogen sulfide solution containing 19 g. of hydrogen sulfide (17.8 g. of sulfur, theoretical) was charged to the bottom of the reaction vessel. Oxygen was also charged to the top of the vessel which was maintained at a temperature of about 50° C. and in which the reaction mixture was stirred by means of said stirring paddle at a speed of about 1750 r.p.m. At the end of the residence time the solution containing the elemental sulfur which formed during the reaction was recovered, the sulfur was filtered off, washed, dried and weighed. There was recovered 11.9 g. of sulfur which corresponded to a 66% yield of the theoretical.

It is to be noted that the yields recovered from the first two examples were relatively larger than that recovered in this example. In addition the solutions which were used in the first two examples and which contained 0.5 mole of potassium acid phosphate along with a catalytic amount of cobalt phthalocyanine trisulfonate may be reused in further or subsequent oxidation of hydrogen sulfide reactions.

*Example IV*

In this example a charge of hydrogen sulfide is treated in a manner similar to that set forth in the above examples, that is, by charging hydrogen sulfide to a reaction vessel containing an aqueous solution which in itself contains 0.5 mole of sodium acid phosphate and a catalytic amount of cobalt phthalocyanine trisulfonate. The elemental sulfur which is formed during the oxidation of the hydrogen sulfide during the reaction time is recovered and separated from the reaction mixture which is then reused for subsequent oxidation steps.

*Example V*

Hydrogen sulfide is charged to the bottom of a reaction vessel which contains an aqueous solution of potassium acid phosphate and vanadium phthalocyanine trisulfonate, the reaction mixture being maintained at a pH in the range of from about 8 to about 10. Oxygen is charged to the top of the reactor while the reaction mixture is continuously stirred for the desired residence time. Upon completion of the reaction the elemental sulfur which is formed during said reaction is separated and recovered while the solution, after separation of the sulfur, is available for further use.

*Example VI*

In this experiment hydrogen sulfide is treated in a manner similar to that set forth in the above examples in the presence of a solution containing 0.5 mole of potassium acid phosphate and a catalytic amount of cobalt phthalocyanine monosulfonate at a pH in the range of from about 8 to about 10. The elemental sulfur which is formed by the oxidation of said hydrogen sulfide is recovered by filtration following which it is washed and dried while the solution is in a reuseable form.

*Example VII*

Another experiment was performed by treating hydrogen sulfide with oxygen in an aqueous solution containing a catalyst comprising sodium acid phosphate and vanadium phthalocyanine trisulfonate, the solution being maintained at a pH in the range of from about 8 to about 10. Upon completion of the desired residence time the elemental sulfur which is formed during the reaction is filtered from the solution, washed and dried while said solution is recovered and may be reused in other batch operations for the production of sulfur.

I claim as my invention:

1. A process for the production of sulfur which comprises reacting oxygen with hydrogen sulfide dissolved in an aqueous solution of a soluble salt selected from the group consisting of alkali metal and alkaline earth metal acid antimonates, arsenates, borates, phosphates and silicates in the presence of a catalyst selected from the group consisting of the monosulfonates, polysulfonates, monocarboxylates and polycarboxylates of cobalt phthalocyanine and vanadium phthalocyanine, and recovering the desired sulfur.

2. A process for the production of sulfur which comprises reacting oxygen with hydrogen sulfide dissolved in an aqueous solution of a soluble salt selected from the group consisting of alkali metal and alkaline earth metal acid antimonates, arsenates, borates, phosphates and silicates in the presence of a catalyst selected from the group consisting of the monosulfonates, polysulfonates, monocarboxylates and polycarboxylates of cobalt phthalocyanine and vanadium phthalocyanine at a pH in the range of from about 8 to about 10, and recovering the desired sulfur.

3. A process for the production of sulfur which comprises treating hydrogen sulfide with oxygen in the presence of an aqueous solution of a soluble salt selected from the group consisting of alkali metal and alkaline earth metal acid antimonates, arsenates, borates, phosphates and silicates, said solution containing a catalyst selected from the group consisting of the monosulfonates, polysulfonates, monocarboxylates and polycarboxylates of cobalt phthalocyanine and vanadium phthalocyanine, and recovering the desired sulfur.

4. A process for the production of sulfur which comprises reacting oxygen with hydrogen sulfide dissolved in an aqueous solution of a soluble salt selected from the group consisting of alkali metal and alkaline earth metal acid antimonates, arsenates, borates, phosphates and silicates, said solution containing a catalyst selected from the group consisting of the monosulfonates, polysulfonates, monocarboxylates and polycarboxylates of cobalt phthalocyanine and vanadium phthalocyanine, and recovering the desired sulfur.

5. A process for the production of sulfur which comprises treating hydrogen sulfide with oxygen in the presence of an aqueous solution of potassium acid phosphate and a catalyst selected from the group consisting of the monosulfonates, polysulfonates, monocarboxylates and polycarboxylates of cobalt phthalocyanine and vanadium phthalocyanine at a pH in the range of from about 8 to about 10, and recovering the desired sulfur.

6. A process for the production of sulfur which comprises treating hydrogen sulfide with oxygen in the presence of an aqueous solution of sodium acid phosphate and a catalyst selected from the group consisting of the monosulfonates, polysulfonates, monocarboxylates and polycarboxylates of cobalt phthalocyanine and vanadium phthalocyanine at a pH in the range of from about 8 to about 10, and recovering the desired sulfur.

7. A process for the production of sulfur which comprises treating hydrogen sulfide with oxygen in the presence of an aqueous solution of lithium acid borate and a catalyst selected from the group consisting of the monosulfonates, polysulfonates, monocarboxylates and polycarboxylates of cobalt phthalocyanine and vanadium phthalocyanine at a pH in the range of from about 8 to about 10, and recovering the desired sulfur.

8. A process for the production of sulfur which comprises treating hydrogen sulfide with oxygen in the presence of cobalt phthalocyanine trisulfonate and an aqueous solution of a soluble salt selected from the group consisting of alkali metal and alkaline earth metal antimonates, arsenates, borates, phosphates and silicates at a pH in the range of from about 8 to about 10, and recovering the desired sulfur.

9. A process for the production of sulfur which comprises treating hydrogen sulfide with oxygen in the presence of cobalt phthalocyanine monosulfonate and an aqueous solution of a soluble salt selected from the group consisting of alkali metal and alkaline earth metal antimonates, arsenates, borates, phosphates and silicates at a pH in the range of from about 8 to about 10, and recovering the desired sulfur.

10. A process for the production of sulfur which comprises treating hydrogen sulfide with oxygen in the presence of vanadium phthalocyanine trisulfonate and an aqueous solution of a soluble salt selected from the group consisting of alkali metal and alkaline earth metal antimonates, arsenates, borates, phosphates and silicates at a pH in the range of from about 8 to about 10, and recovering the desired sulfur.

11. A process for the production of sulfur which comprises treating hydrogen sulfide with oxygen in the presence of an aqueous solution of potassium acid phosphate and cobalt phthalocyanine trisulfonate at a pH in the range of from about 8 to about 10, and recovering the desired sulfur.

12. A process for the production of sulfur which comprises treating hydrogen sulfide with oxygen in the presence of an aqueous solution of sodium acid phosphate and cobalt phthalocyanine trisulfonate at a pH in the range of from about 8 to about 10, and recovering the desired sulfur.

13. A process for the production of sulfur which comprises treating hydrogen sulfide with oxygen in the presence of an aqueous solution of potassium acid phosphate and vanadium phthalocyanine trisulfonate at a pH in the range of from about 8 to about 10, and recovering the desired sulfur.

14. A process for the production of sulfur which comprises treating hydrogen sulfide with oxygen in the presence of an aqueous solution of potassium acid phosphate and cobalt phthalocyanine monosulfonate at a pH in the range of from about 8 to about 10, and recovering the desired sulfur.

15. A process for the production of sulfur which comprises treating hydrogen sulfide with oxygen in the presence of an aqueous solution of sodium acid phosphate and vanadium phthalocyanine trisulfonate at a pH in the range of from about 8 to about 10, and recovering the desired sulfur.

No references cited.